United States Patent [19]
Cachot et al.

[11] Patent Number: 5,131,067
[45] Date of Patent: Jul. 14, 1992

[54] MECHANICAL FUSE DEVICE FOR THE ACCESS CABLE TO A SUBMERGED EQUIPMENT HOUSING

[75] Inventors: Jacques Cachot, Saint Michel sur Orge; André Pelet, Maurepas; François Crespo-Ruiz, Paris all of France

[73] Assignee: Alcatel Cit, Paris, France

[21] Appl. No.: 738,642

[22] Filed: Jul. 31, 1991

[30] Foreign Application Priority Data

Jul. 31, 1990 [FR] France ................... 90 09756

[51] Int. Cl.⁵ .............. G02B 6/44; H02G 3/00
[52] U.S. Cl. .................. 385/138; 385/139; 385/137; 385/135; 385/110; 385/100; 174/70 R; 174/70 S
[58] Field of Search ............ 385/76, 84, 100, 86, 385/135, 87, 137, 139, 105, 112, 110, 138; 174/70 S, 70 R

[56] References Cited

U.S. PATENT DOCUMENTS

| | | | |
|---|---|---|---|
| 4,253,729 | 3/1981 | Rocton | 385/138 X |
| 4,521,642 | 6/1985 | Vives | 174/70 S |
| 4,598,290 | 7/1986 | Collins et al. | 385/138 X |
| 4,630,888 | 12/1986 | Dubar | 385/76 |
| 4,714,316 | 12/1987 | Moore et al. | 385/137 X |
| 4,721,355 | 1/1988 | Gould | 385/76 |
| 4,755,632 | 7/1988 | Pelet et al. | 174/70 S |
| 4,770,481 | 9/1988 | Haas | 385/138 X |
| 4,786,759 | 11/1988 | Gouverneur | 174/70 S |

FOREIGN PATENT DOCUMENTS 2197287 5/1988 United Kingdom ........... 385/139 X

Primary Examiner—Brian Healy
Attorney, Agent, or Firm—Sughrue, Mion, Zinn, Macpeak & Seas

[57] ABSTRACT

A mechanical fuse device for an access cable to a submerged equipment housing in a cable transmission link, said access cable including a tube enclosing items that provide transmission and being equipped with a longitudinal sealing device, wherein the mechanical fuse device comprises means for responding to traction exerted on the cable upstream relative to the equipment housing by retaining a portion of the cable upstream from the sealing device and exerting a crushing effect on the tube.

8 Claims, 3 Drawing Sheets

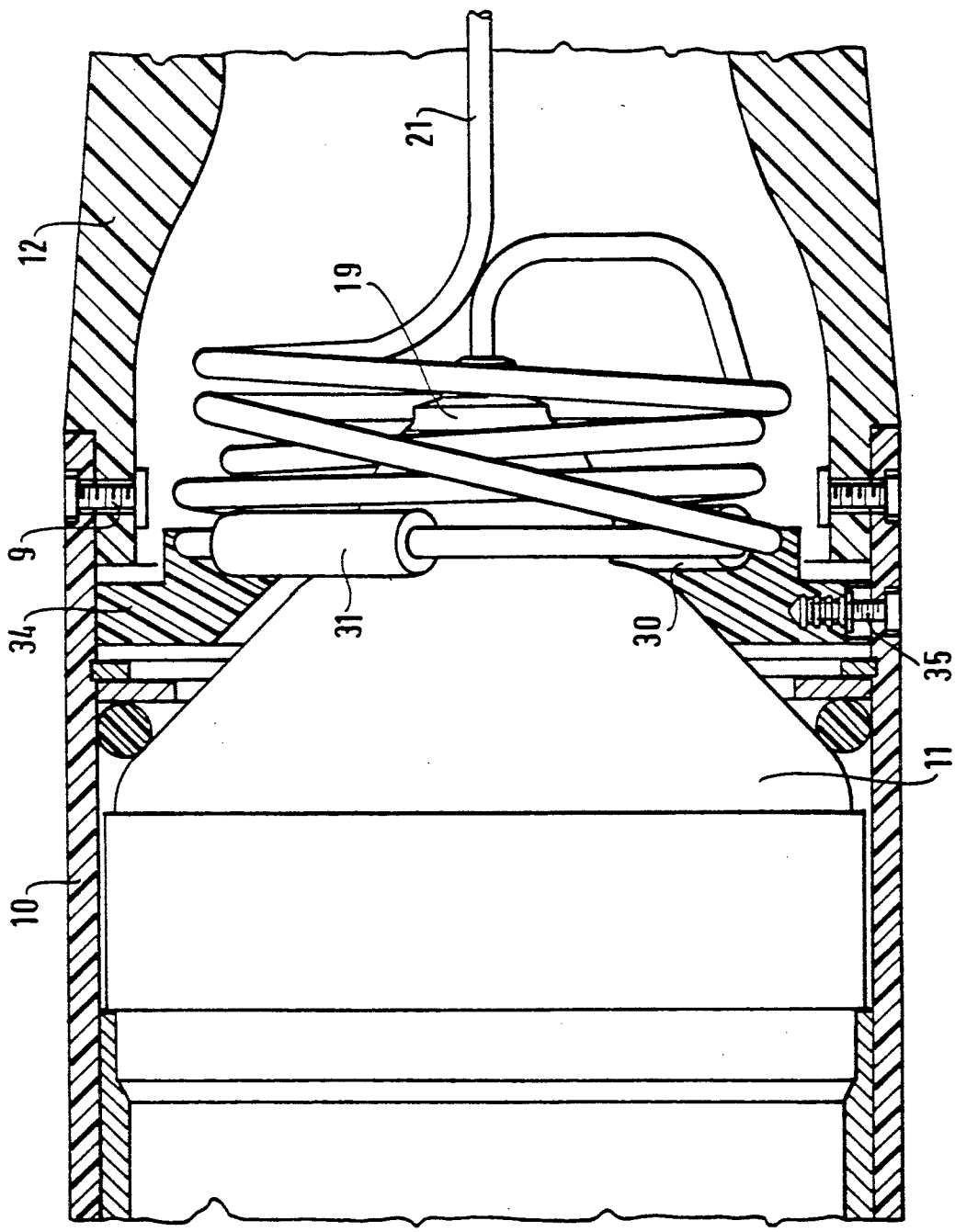

5,131,067

MECHANICAL FUSE DEVICE FOR THE ACCESS CABLE TO A SUBMERGED EQUIPMENT HOUSING

The invention relates to cable transmission links provided with submerged equipment housing, and more particular to the connection between such a housing and an inlet cable. The invention is particularly applicable to cable transmission links having optical fibers and fitted with undersea repeaters.

BACKGROUND OF THE INVENTION

In the undersea repeaters of a cable transmission link having optical fibers, the access cables to a repeater are constituted by respective metal tubes sheathed in insulating material and containing the optical fibers. A repeater is provided with two access cables, one at each end. The description below relates to the items associated with one of the ends of a repeater, it being understood that the same items are identically disposed at the other end.

Such a connection is described in French Pat. No. 86 15874 filed Nov.14, 1986. The access cable is provided with a sealing device which provides longitudinal sealing in the event of the cable breaking, thereby preventing water penetrating into the repeater and destroying it. In the event of accidental traction on the access cable, that device is effective only if the cable breaks at a point situated upstream from the sealing device relative to the repeater, and it is not effective if the break is between the sealing device and the repeater.

That is why provision has been made, as described in the above-mentioned French patent, for a mechanical fuse which, in the event of a force exceeding a given value, causes the cable to break upstream from the longitudinal sealing device.

That fuse is constituted by a plug fitted over and fixed to one end of the tube and including the optical fibers of the access cable, a ring fixed to a cable head and engaged on the plug, and a set of pins holing the ring and the plug together transversely. Under the effect of traction greater than the given value, the plug is ejected from the wall of the cable head, thereby breaking the fibers upstream from the sealing device, inside the tube or inside the cable head.

The metal tube in an access cable is obtained by metal drawing, so access cables present wide dispersion in their resistance to traction. In order to ensure that the mechanical fuse is effective regardless of which access cable is used, the fuse is designed to break the connection at a traction value that is lower than the minimum traction strength tolerance that can be accepted for a cable, and for a tube of given transverse dimensions.

The characteristics to be taken into account for the function attributed to the fuse make it relatively fragile by construction. During repeater manufacture, the operation of fuse assembly runs the risk of accidental breakage. This risk increases with decreasing outside diameter of the tube of the access cable (for substantially identical inside diameter, as is becoming the case in more recent connections). In order to ensure that it remains effective, matching the fuse to these new dispositions would require its sensitivity to be increased, thereby reducing the strength of the pins, and thus making it too fragile and ill-suited to the cycle during which the housings of equipment to be submerged are prepared.

An object of the present invention is to provide a connection which presents no risk of breaking accidentally during assembly operations in the factory, regardless of the traction strength characteristics of the tub in the cable concerned.

Another object of the invention is to provide a connection which, in the event of traction greater than a predetermined value being exerted on the cable, reliably ensures that the access cable breaks together with all of the optical fibers it contains upstream from the longitudinal sealing device.

SUMMARY OF THE INVENTION

The present invention provides a mechanical fuse device for an access cable to a submerged equipment housing in a cable transmission link, said access cable including a tube enclosing items that provide transmission and being equipped with a longitudinal sealing device, wherein the mechanical fuse device comprises means for responding to traction exerted on the cable upstream relative to the equipment housing by retaining a portion of the cable upstream from the sealing device and exerting a crushing effect on the tube.

Advantageously, said means for retaining a portion of said cable comprise a thickening thereof co-operating with at least one fixing clamp, with the means for exerting a crushing effect on the tube being constituted by said fixing clamp.

The thickening is preferably made by molding plastic around a portion of the cable.

Preferably, the fuse includes two fixing clamps, one at each end of the thickening, the clamps being disposed on a disk which is fixed relative to the equipment housing and which is disposed on the same axis.

The thickening may be in the form of a cylinder whose axis extends perpendicularly to the axis of the equipment housing.

The thickening may be disposed in a semicylindrical cavity of the disk.

The longitudinal sealing device may be fixed to said disk.

The disk may be fixed to an outer shell of the equipment housing by means of radial screws.

BRIEF DESCRIPTION OF THE DRAWINGS

An embodiment of the invention is described by way of example with reference to the accompanying drawing, in which:

FIG. 2 is a view on a larger scale of a portion of FIG. 1; and

DETAILED DESCRIPTION

Figure 1:
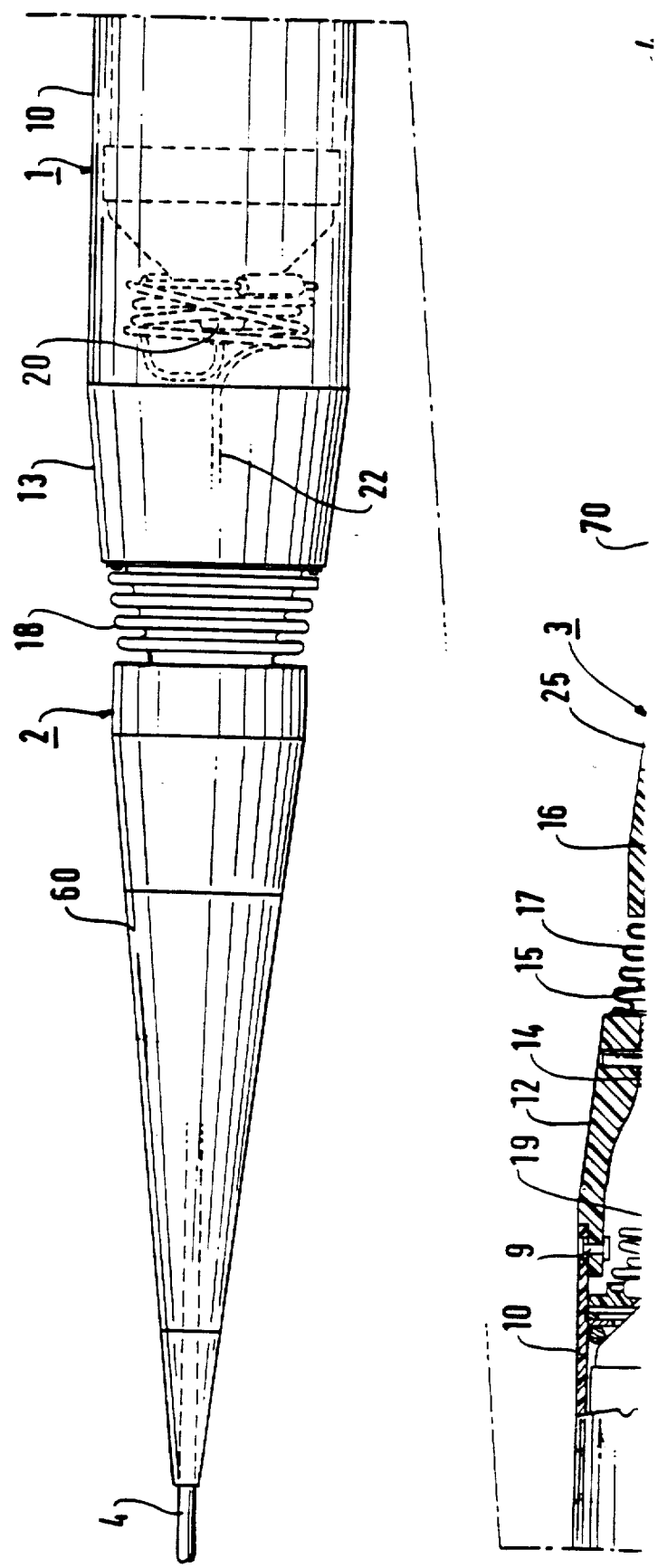
FIG. 1 is an elevation view, partially in section, of an undersea repeater shown as two separate halves for reasons of convenience.

As can be seen in FIG. 1, an undersea repeater for an optical fiber cable transmission link is generally in the form of a cylindrical cask 1 which is extended at both ends by generally conical connection devices 2 and 3 for connection to line cable 4.

In the version shown, the cylindrical cask comprises an outer shell 10 made of fiber-resin composite, e.g. glass-epoxy composite covering a very rigid metal case 11 which is sheathed in polyethylene and which encloses the internal equipment of the repeater.

The outer shell 10 which is very strong in traction is extended by sleeves 12 and 13 fixed thereto by screws 9. Inside each sleeve, there is a joint system 14 comprising an axial oscillating arm 15 screwed to an anchor element 16 which is fixed to a corresponding one of the connection devices. The oscillating arm 15 is received in a bellows 17 or 18 which interconnects the sleeve 12 or 13 and the conical envelope 60 or 70 of the connection device 2 or 3.

The watertight and very rigid metal case isolates the internal equipment of the repeater from seawater. It is provided at each end with a sealed feedthrough 19 or 20 enabling a cable connection tail to connect its internal equipment to the line cable heads that terminate in the connection devices 2 and 3.

The connection between the line cable 4 and the cable connection tails 21 and 22 is established in splice boxes such as 25 disposed inside the anchor elements 16. The splice boxes also serve to house slack.

Each cable connection tail 21 and 22 is provided with means for ensuring longitudinal sealing between the cable and the inside of the repeater. Such means may be as described in French Pat. No. 86 02810 filed Feb. 28, 1986, for example. Since they lie outside the scope of the present invention, they are not described herein and for further details the reader may refer to the above-mentioned patent. It is merely observed that the sealing device is in the form of a cylindrical thickening on the cable connection tail referenced 30 in FIGS. 2 and 3. This sealing device is placed as close as possible to the outlet from the sealed feedthrough 19 or 20.

In accordance with the invention, the cable connection tail 21 or 22 is provided with means so that in the event of traction being exerted on the cable connection tail, the tail breaks upstream from the sealing device. In one embodiment shown in greater detail in FIGS. 2 and 3 for cable connection tail 21, the tail is held fast at a thickening 21 disposed between two fixing clamps 32 and 33. These clamps are fixed to a disk 34 made of a corrosion-resistant material, e.g. of the same type as the material which constitutes the shell 10. The disk 34 has a central hole 38 and is disposed on the same axis as the repeater, substantially level with the sealed feedthrough 19 which passes through the hole 38. The disk is fixed to the shell 10 by radial screws 35.

The thickening is made by molding plastic over a portion of the cable connection tail, and preferably giving the molding a cylindrical shape. The thickening can thus be positioned in a semicylindrical cavity formed in one of the faces of the disk 34 with the axis of the cavity being perpendicular to the axis of the repeater which is the direction in which traction forces, if any, will be exerted.

The disk 34 advantageously also has a radial slot 37 opening out into the hole 38 and preferably situated parallel to the semicylindrical cavity, the slot 37 facilitating passage of the cable connection tail 21 during installation thereof.

It may be observed that between the thickening 31 and the splice box 25, the cable connection tail 31 has a plurality of turns so as to impart flexibility to the joint system 14 (FIG. 1).

In the event of traction being exerted on the connection tail because of traction being exerted on the line cable, i.e. upstream relative to the repeater, the cable connection tail will tend to lengthen. The optical fibers coiled down in the reserve of slack will unwind a little to provide the slack required for compensating the elongation of the metal tube of the cable prior to rupture. With traction continuing in a direction at about 90° to the plane of the disk 34, the connection tail becomes kinked at the clamp 33 and presses thereagainst, thereby crushing the tube at this location and breaking the tube together with the fibers it contains.

The sealing device may advantageously be fixed to the disk 34 in the same manner as the thickening 31, and parallel thereto.

Figure 3:
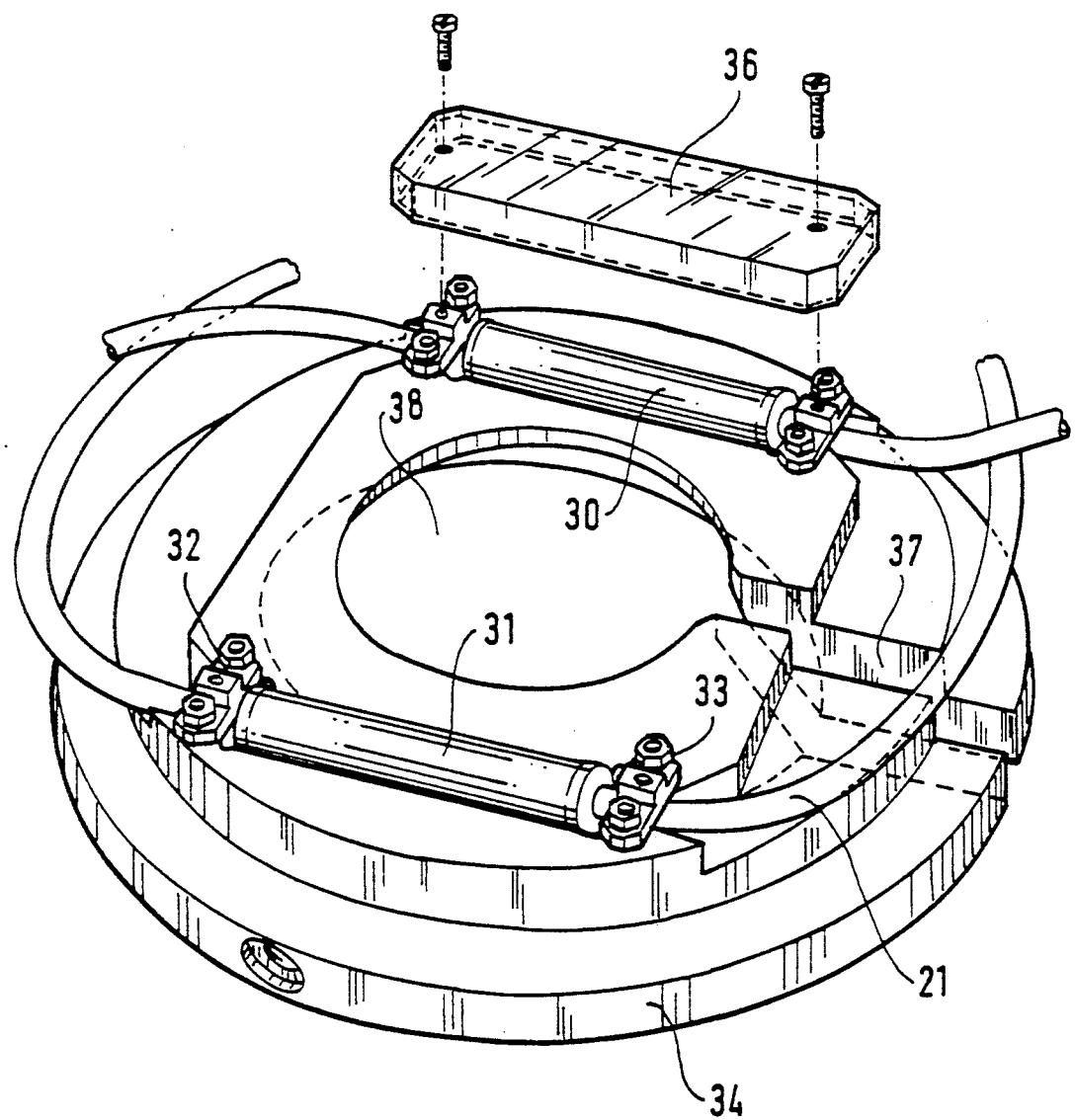
FIG. 3 is a perspective view of the support disk for the mechanical fuse device of the access cable.
Figure 3:
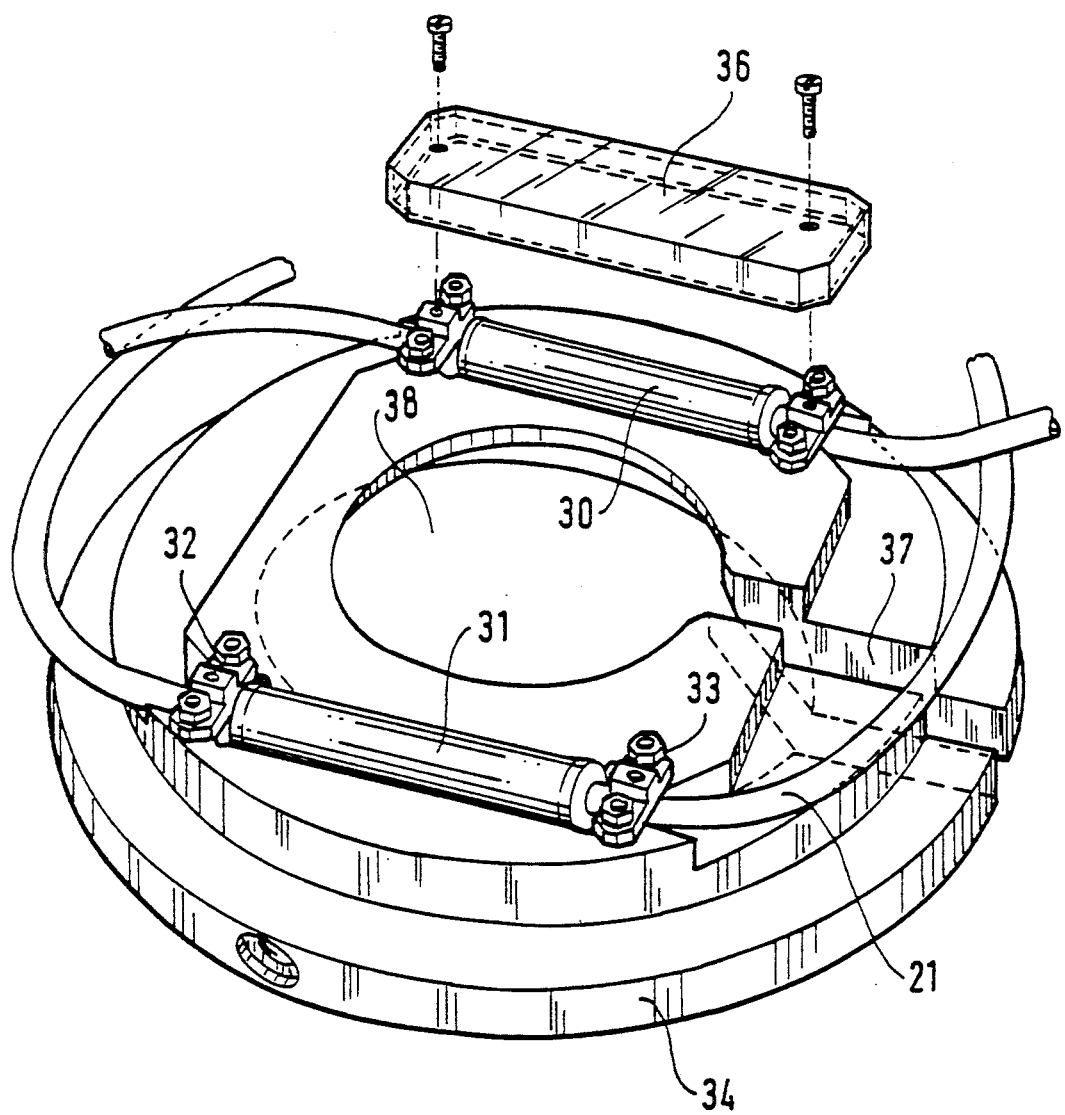

A plastic cover 36 may serve to protect the sealing device 30. It may be held in place, for example, by resilient tabs engaging in holes in the disk, or else, as shown in FIG. 3, by plastic screws received in tapped holes formed in the clamps. A similar cover (not shown) may protect the thickening 31.

The invention is applicable to any connection between a cable access tail and a submerged housing for electrical, optoelectronic, or other equipment, in particular when the cable is a small diameter cable.

We claim:

1. A mechanical fuse device for an access cable to a submerged equipment housing in a cable transmission link, said access cable including a tube enclosing items that provide transmission and being equipped with a longitudinal sealing device, said mechanical fuse device comprising means for retaining a portion of the cable upstream from the sealing device and for exerting a crushing effect on the tube in response to traction forces exerted on the cable upstream relative to the equipment housing and at an angle to the direction of said traction forces exerted on the cable.

2. A device according to claim 1, wherein said means for retaining a portion of said cable comprise a thickening thereof co-operating with at least one fixing clamp, with the means for exerting a crushing effect on the tube being constituted by said at least one fixing clamp.

3. A device according to claim 2, wherein the thickening is made by molding plastic around a portion of the cable.

4. A device according to claim 2, wherein said at least one fixing clamp comprises two fixing clamps, one at each end of the thickening, the clamps being disposed on a disk which is fixed relative to the equipment housing and which is disposed on the same axis.

5. A device according to claim 4, wherein the thickening is in the form of a cylinder whose axis extends perpendicularly to the axis of the equipment housing.

6. A device according to claim 5, wherein the thickening is disposed in a semicylindrical cavity of the disk having an axis perpendicular to the direction of the traction forces acting on the cable.

7. A device according to claim 4, wherein the longitudinal sealing device is fixed to said disk.

8. A device according to claim 4, wherein the disk is fixed to an outer shell of the equipment housing by means of radial screws.

* * * * *

UNITED STATES PATENT AND TRADEMARK OFFICE
CERTIFICATE OF CORRECTION

PATENT NO. : 5,131,067
DATED : July 14, 1992
INVENTOR(S) : Jacques Cachot et al

It is certified that error appears in the above-indentified patent and that said Letters Patent is hereby corrected as shown below:

In the Drawings:

Sheet 1 of 3 consisting of Fig. 3, should be deleted and replaced with Sheet 1 of 3, consisting of Fig. 1, as shown on the attached page.

Signed and Sealed this

Fifteenth Day of March, 1994

Attest:

BRUCE LEHMAN

Attesting Officer      Commissioner of Patents and Trademarks